(12) United States Patent
Öbrink et al.

(10) Patent No.: US 12,018,467 B2
(45) Date of Patent: Jun. 25, 2024

(54) WATER RECIRCULATION SYSTEM INTENDED FOR RECYCLING OF WATER OR DISCARDING OF WATER NOT SUITABLE TO RECYCLE

(71) Applicant: ORBITAL SYSTEMS AB, Malmö (SE)

(72) Inventors: Mårten Öbrink, Malmö (SE); Michael Ridell, Staffanstorp (SE)

(73) Assignee: ORBITAL SYSTEMS AB, Malmo (SE)

( * ) Notice: Subject to any disclaimer, the term of this patent is extended or adjusted under 35 U.S.C. 154(b) by 472 days.

(21) Appl. No.: 17/298,009

(22) PCT Filed: Nov. 14, 2019

(86) PCT No.: PCT/SE2019/051151
§ 371 (c)(1),
(2) Date: May 27, 2021

(87) PCT Pub. No.: WO2020/112001
PCT Pub. Date: Jun. 4, 2020

(65) Prior Publication Data
US 2022/0098841 A1    Mar. 31, 2022

(30) Foreign Application Priority Data

Nov. 28, 2018    (SE) .................... 1851478-6

(51) Int. Cl.
*E03C 1/04* (2006.01)
*E03C 1/044* (2006.01)
(Continued)

(52) U.S. Cl.
CPC ............ *E03C 1/0408* (2013.01); *E03C 1/044* (2013.01); *F24D 17/0005* (2013.01);
(Continued)

(58) Field of Classification Search
None
See application file for complete search history.

(56) References Cited

U.S. PATENT DOCUMENTS

| 6,247,350 B1 | 6/2001 | Okumura et al. |
| 2005/0215916 A1 | 9/2005 | Fadem et al. |
| (Continued) | | |

FOREIGN PATENT DOCUMENTS

| CN | 103261800 | 8/2013 |
| GB | 2497264 A | 6/2013 |
| (Continued) | | |

OTHER PUBLICATIONS

Harrison et al: "Design and Testing of an Integrated Circuit for Multi-Electrode Neural Recording", 20th International Conference on VLSI Design held jointly with 6th International Conference on Embedded Systems, pp. 907-912, 2007.
(Continued)

*Primary Examiner* — Krishnan S Menon
(74) *Attorney, Agent, or Firm* — MOSER TABOADA

(57) ABSTRACT

The present invention describes a water recirculation system intended for recycling of water or discarding of water not suitable to recycle, said water recirculation system (1) comprising a flow path for recirculation (50), at least one water treating unit (6), and a sensor unit (7) arranged for measurement of at least water quality, and wherein the sensor unit (7) is connected to a control unit which decides if water should be recycled or discarded in a point of separation (30) based on the measurement of the water
(Continued)

quality, said water recirculation system (1) also comprises a first heating source (00), and wherein the water recirculation system (1) also comprises a second heating source (200).

18 Claims, 6 Drawing Sheets

(51) Int. Cl.
  *F24D 17/00* (2022.01)
  *F24D 19/10* (2006.01)
(52) U.S. Cl.
  CPC ..... *F24D 17/0078* (2013.01); *F24D 17/0089* (2013.01); *F24D 19/1051* (2013.01); *E03C 2201/40* (2013.01)

(56) References Cited

U.S. PATENT DOCUMENTS

| | | | |
|---|---|---|---|
| 2009/0134080 A1 | 5/2009 | Fabig | |
| 2015/0344323 A1* | 12/2015 | Mahdjoubi Namin | ........................ A47K 3/281 210/86 |
| 2016/0120432 A1 | 5/2016 | Chowdhury et al. | |
| 2017/0172447 A1 | 6/2017 | Grundlehner et al. | |
| 2018/0078164 A1 | 3/2018 | Menon et al. | |

FOREIGN PATENT DOCUMENTS

| | | | |
|---|---|---|---|
| WO | WO-2011157426 | 12/2011 | |
| WO | WO-2013095278 | 6/2013 | |
| WO | WO-2017099663 A1 | 6/2017 | |
| WO | WO-2018097790 A1 * | 5/2018 | ............... A61L 2/10 |

OTHER PUBLICATIONS

Matthews et al: "Real Time Workload Classification from an Ambulatory Wireless EEG System Using Hybrid EEG Electrodes", 30th Annual International IEEE Engineering in Medicine an Biology Society, Vancouver, British Columbia, Canada, pp. 5871-5875, Aug. 2008.

Sellers et al: "A Novel Dry Electrode for Brain-Computer Interface", 13th International Conference, Human-Computer Interaction International 2009, San Diego, CA, USA, Proceedings, Part II, pp. 1-10, Jul. 2009.

Mora Lopez et al: "An Implantable 455-Active-Electrode 52-Channel CMOS Neural Probe", IEEE Journal of Solid-State Circuits, vol. 49, No. 1, pp. 248-261, Jan. 2014.

Xu et al: "A Wearable 8-Channel Active-Electrode EEG/ETI Acquisition System for Body Area Networks", IEEE Journal of Solid-State Circuits, vol. 49, No. 9, pp. 2005-2016, Sep. 2014.

Raducanu et al: "Time multiplexed active neural probe with 678 parallel recording sites", 46th European Solid-State Device Research Conference, pp. 385-388, Sep. 2016.

Versek et al: "Electric field encephalography for brain activity monitoring", Journal of Neural Engineering, Institute of Physics Publishing, Bristol, Great Britain, vol. 15, 046027, pp. 1-16, Jun. 13, 2018.

International Search Report for Application No. PCT/SE2019/051151, dated Sep. 1, 2020.

Extended European Search Report in EP20174008.1 dated Nov. 11, 2020.

* cited by examiner

WATER RECIRCULATION SYSTEM INTENDED FOR RECYCLING OF WATER OR DISCARDING OF WATER NOT SUITABLE TO RECYCLE

FIELD OF THE INVENTION

The present invention relates to a water recirculation system intended for recycling of water or discarding of water not suitable to recycle, especially to the heating system of such a water recirculation system.

TECHNICAL BACKGROUND

Water recirculation systems are known. One example, in the form of a shower, is disclosed in WO 2013/095278 which describes a hybrid device for a recirculation shower, allowing purification and either recycling of water or discarding of water, where said hybrid device comprises a recirculation loop, a filter system with a nano-filter, and at least one filter quality sensor, and wherein the hybrid device is arranged to redirect the water from recirculation to drainage when the at least one filter quality sensor indicates the need thereof. The device disclosed in WO 2013/095278 comprises a so called modified drain which collects the water used and facilitates the stream of water towards the recycling loop and filter system or towards drainage. In one embodiment of the WO 2013/095278, the modified drain comprises at least one sensor, indicating the water quality, as mentioned above, and wherein the hybrid device is arranged to redirect the water from recirculation to drainage when the at least one water quality sensor indicates the need thereof.

The present invention refers to a water recirculation system comprising a heating system. Different types of heating systems are suggested for water recirculation systems today. For instance, in WO 2018/097786 there is disclosed a combined water heater and water treatment device comprising a water treatment unit being embedded by a single container of the combined water heater and water treatment device, and said combined water heater and water treatment device also comprising a heater element arranged on the outside of the single container of the combined water heater and water treatment device.

One aim of the present invention is to provide a water recirculation system comprising a heating system with several advantages, such as e.g. being efficient and easy to implement.

SUMMARY OF THE INVENTION

The latter stated purpose above is achieved by a water recirculation system intended for recycling of water or discarding of water not suitable to recycle, said water recirculation system comprising a flow path for recirculation, at least one water treating unit, and a sensor unit arranged for measurement of at least water quality, and wherein the sensor unit is connected to a control unit which decides if water should be recycled or discarded in a point of separation based on the measurement of the water quality, said water recirculation system also comprises a first heating source, and wherein the water recirculation system also comprises a second heating source.

As understood from above, the water recirculation system according to the present invention comprises several components. First of all, a water treating unit is arranged to enable to increase the water quality of the water and thus increase the possibility of increasing the recirculation percentage. Moreover, the sensor unit is arranged for measurement of water quality. A control unit enables for the system to be directed to recirculating water or discarding water based on the water quality. Furthermore, as should be understood from above, the water recirculation system according to the present invention comprises a first heating source and a second heating source.

The present invention, presenting a water recirculation system having at least two heating sources provides several advantages over existing systems. First of all, the at least two heating sources may be used to overcome a lack of power at peak power demand times in comparison to if only one heating source is used. If only one heating source is used, this has to be run heavily at such peak power demand situations. As will be further explained below, using two or more heating sources implies that the load on each of the heating sources may be reduced to reach a certain energy/effect output. This may be very beneficial in some applications.

Moreover, another advantage with the arrangement of two heating sources is to increase the operation stability of the water recirculation system, i.e. the water recirculation system may also operate even if one heating source does not work.

SPECIFIC EMBODIMENTS OF THE INVENTION

Below some specific embodiments of the present invention are disclosed. According to one specific embodiment of the present invention, the first heating source and the second heating source are different types of heating sources. This is not a mandatory feature according to the present invention, however is natural for several different applications according to the present invention. In relation to the above it should be mentioned that the expression "heating source" should not be misunderstood to imply "heating medium". For instance, two different types of heating sources may very well heat the same type of heating medium used according to the present invention. As an example, hot water is suitably used as the heating medium for several different types of heating sources, such as e.g. a LPG heater, any type of heating exchanging solution where hot water is accessed, solar panels heating water, etc. etc.

It should, however be understood, that also "direct" heating sources may be used according to the present invention. For instance, a circuit arrangement may be used to transfer heat generated into the recirculated water in the flow path for recirculation. This is further explained below.

According to another specific embodiment of the present invention, the first heating source or the second heating source is a heater tank containing a heating element. According to this embodiment, the tank containing a heating element may involve electrical heating. Furthermore, a combined UV and heater tank as disclosed in WO 2018/097786 may very well function as the first or second heating source according to the present invention.

According to yet another specific embodiment of the present invention, the first heating source or the second heating source is an external heating source. In this case an external heating source should be seen as a unit which in itself produces heating energy which is then transferred to the water recirculation system, such as via a heating medium, suitably water. Examples are LPG heater or solar energy units/panels. To compare with a container with internal heating, e.g. with a coil or electrical heating, this may be seen as internal or direct heating in the water recirculation system. Again, it should be noted that the present invention is mainly directed to water-water heating implying that a LPG heater or solar panels heat water used to heat the water used inside of the water recirculation system.

According to yet another specific embodiment of the present invention, the first heating source and/or the second heating source is provided as a heat exchange arrangement. This should be understood from above, however it should be noted that the heating source in itself may be a solar panel or LPG heater, which heat water then used for heat exchanging towards the water intended to be recirculated, or may in fact be excess tempered water.

According to one specific embodiment of the present invention, the point of separation is arranged in a drain and the heat exchange arrangement is provided in the drain so that water sent to waste is arranged to heat fresh cold water flown into the water recirculation system. In this case, the water recirculation system is arranged to maximize the utilization of heating energy instead of sending unclean tempered water directly to waste. The type of heat exchange arrangement provided in the drain may be of different type, e.g. implemented by any type of heat exchanging device.

The present invention provides a system where two types of heating sources interact in an optimal way. One first heating source which may be comparatively slow to regulate provides for a base energy demand. A second heating sources providing fast regulation may be used to take care of peak demands, e.g. during long term use or clean heating of loops in the water recirculation system.

According to one specific embodiment of the present invention, a heat exchange arrangement is arranged in connection to said at least one water treating unit. Such an arrangement example is for instance to use hot or at least tempered water produced in another unit, which then may be led directly to the water treating unit. For instance, in the case hinted above where a combined UV and heating unit is implemented, then hot water may be led in coils intended to heat water content inside of the combined UV and heating unit. In relation to this alternative it should be noted that also other versions are totally possible. To give one example, hot water produced in one unit in a house, for instance in a washing machine or a dishwasher, may be used as a heating source to indirectly heat the water flow in the water recirculation system according to the present invention. In this context, indirectly heating may be seen as using a heat exchanging functions with a coil inside of a container or the like where the water flow in the water recirculation system is to be heated.

According to yet another specific embodiment of the present invention, said at least one water treating unit is a light unit provided inside of a vessel and wherein the heat exchange arrangement is arranged as a jacket of this vessel. The light unit may be of different type. Non-limiting examples are a UV light unit, e.g. a UV lamp, or one or more LED units.

Furthermore, according to yet another specific embodiment of the present invention, the first heating source is also arranged in connection with said at least one water treating unit. To give one example of this is a combined light and heating unit with jacket heating, for instance a combined UV and heating unit with jacket heating.

As should be understood from above, according to one specific embodiment of the present invention, the first heating source and the second heating source are positioned in one and the same unit. According to one specific embodiment of the present invention, the first heating source and the second heating source are positioned in one and the same unit, wherein at least one of these is arranged as a heat exchange arrangement as a jacket of the unit. Again, a combined UV/heater solution with a jacket arrangement is one such possible solution according to the present invention. In such an alternative it should be noted that the entire unit has to be large enough to both provide enough jacket surface as well as contain or be connected to another heating unit. It should also be said that both heating sources may be arranged as jacket heating solutions in the unit, e.g. as separate portions along the unit.

The present invention also relates to a method of operation. Therefore, according to one specific embodiment the present invention refers to a method for operating a water recirculation system according to the present invention, said method involving using a first heating source to provide heating for a base heating demand; and using a second heating source to provide heating for peak heating demands as additional heating on top of the heating provided by the first heating source. As hinted, one purpose of the present invention is to use an inexpensive energy source to create a first level of heating energy to use in the water recirculation system. This should provide for the base heating demand in the water recirculation system. As it will be too expensive and insufficient to incorporate a first heating source with the ability to also provide for peak heating demand times, such as during long time use or in clean heating, the present invention provides two different types of heating sources with different properties. The second heating source is instead fast to regulate and provides the needed additional heating effect during peak heating demands, e.g. during clean heating of the system. It should be noted that the second heating source provides a complement to the first heating source.

According to one specific embodiment of the present invention, the second heating source is arranged to provide faster adjustability than the first heating source. As understood from above, as the second heating source is intended to take care of peak heating demands, this second heating source has to have higher adjustability than the first heating source. Such specific events are e.g. during clean heating cycles where loops of or the entire water recirculation system is decontaminated, or during long time use with comparatively high water temperatures.

Furthermore, the present invention also refers to a method for operating a water recirculation system, where said method involves using the first heating source and the second heating source in different operation sequences. This implies that it may be said that a main heating source or first heating source is intended to heat the water during a regular use, however a second heating source may be used together with the first heating source as a complement during sequences when the heat demand is higher, e.g. during a heating cycle when a system may be heated up for decontamination purposes or the like. It should be said that both energy sources may also be used during regular use as a complement to each other. For instance, when the water recirculation system is a shower, regular use may be seen as a shower operation. Also in this case, there may be need for a heating cycle where the entire recirculation loop is heated up to prevent growth of contaminants.

According to yet another specific embodiment of the present invention, the first heating source or the second heating source is a heat exchange arrangement and where the operating of flowing water to waste implies heat exchanging this waste water flow against fresh cold water flown into the water recirculation system. This alternative has been described above.

Besides showers also many other applications may be of relevance according to the present invention. For instance, sinks are one such example. As yet another example, the water recirculation system may function as a water recirculation and distribution system in e.g. RVs (recreation vehicles). Also in this case, a shower unit or a sink unit may be part of the entire water recirculation and distribution unit. In line with was has been disclosed above, according to one specific embodiment of the present invention, the water recirculation system is a plug-in solution for a water distribution architecture comprising one or more user units, a water tank intended for water usage, a pump and a heating source, being the first heating source or the second heating source, wherein the water recirculation system comprises a water distribution unit, said water distribution unit comprising one common user unit inlet connectable via piping to said one or more user units on their used water output side;

said water distribution unit further comprising a contaminated water outlet; and said water distribution unit further comprising at least one water recirculation port connectable via piping to the water tank to enable flowing water between the water distribution unit and the water tank; and wherein said at least one water treating unit enables to treat water to increase the water quality thereof and where the sensor unit is connected to a control unit, and based on the measurement of the water quality, is arranged to decide if water should be recycled to the water tank from the water distribution unit or should be discarded via the contaminated water outlet from the water distribution unit.

The heating source mentioned above may be seen as a first heating source or a second heating source. Moreover, to give one example referring to this type of RV application, then one of the heating sources may be a boiler. The second heating source may e.g. be a heat exchanging arrangement.

Furthermore, it may be mentioned that water not suitable to recirculate may be led to a grey water tank via the contaminated water outlet.

Moreover, in relation to the at least one recirculation port above it should mentioned that this component is arranged to ensure a water flow between the water distribution unit and the water tank. A flow both ways should be enabled. Therefore, suitably the at least one water recirculation port is two ports being a water recirculation outlet connectable via piping to the water tank and a water feed inlet connectable via piping to the water tank and/or to a fresh water inlet of the water distribution architecture. If only one recirculation port is provided, then the system as a whole must enable to direct the flow in opposite directions in one and the same pipe.

According to yet another embodiment of the present invention, the water recirculation system is a plug-in solution for a water distribution architecture comprising one or more user units, a water tank intended for water usage, a pump and a heating source, being the first heating source or the second heating source, and a grey water tank, wherein the water recirculation system comprises a water distribution unit, said water distribution unit comprising one common user unit inlet connectable via piping to said one or more user units on their used water output side;

said water distribution unit further comprising a contaminated water outlet connectable via piping to the grey water tank;

said water distribution unit further comprising a water recirculation outlet connectable via piping to the water tank;

and said water distribution unit further comprising a water feed inlet connectable via piping to the water tank and/or to a fresh water inlet of the water distribution architecture;

and wherein said at least one water treating unit enables to treat water to increase the water quality thereof and wherein the sensor unit is connected to a control unit, and based on the measurement of the water quality, decides if water may be recycled to the water tank from the water distribution unit or should be discarded and sent to the grey water tank from the water distribution unit.

To give some further examples of water recirculation system according to the present invention, especially relating to RVs, the one or more user units may be one shower and/or at least one sink. Moreover, the one or more user units may be connected to the water tank via piping both on a cold water side and on a hot water side. Furthermore, and as mentioned, the contaminated water outlet may be connectable via piping to a grey water tank of the water distribution architecture. This may be operated by gravitational force. Moreover, said at least one water treating unit may be arranged inside of the water distribution unit. Moreover, said at least one water treating unit may comprise a light unit, such as a UV light. Furthermore, said at least one water treating unit may be combined with a filter. Furthermore, a system according to the present invention may comprise one or several filters, such as a rough filter arranged at a different position than the water treating unit. Moreover, at least one sensor of the sensor unit may be arranged inside of the water distribution unit. Furthermore, the water distribution unit suitably comprises a pump enabling to pump treated water from the water distribution unit and out from the water recirculation outlet and to the water tank.

Also in this case, according to one embodiment, the present invention refers to using a first heating source to provide heating for a base heating demand, and using a second heating source to provide heating for peak heating demands as additional heating on top of the heating provided by the first heating source. Moreover, according to yet another specific embodiment of the present invention, the second heating source is arranged to provide faster adjustability than the first heating source.

According to one embodiment, the present invention refers to a method comprising using a water recirculation system as disclosed above, for flowing water from a water tank of a water distribution architecture to the water distribution unit of the water recirculation system to enable water treatment to increase the water quality.

Furthermore, according to yet another embodiment, said method involves using the first heating source and the second heating source in different operation sequences. This alternative has been explained above, and why this may be of interest.

Figure 1:
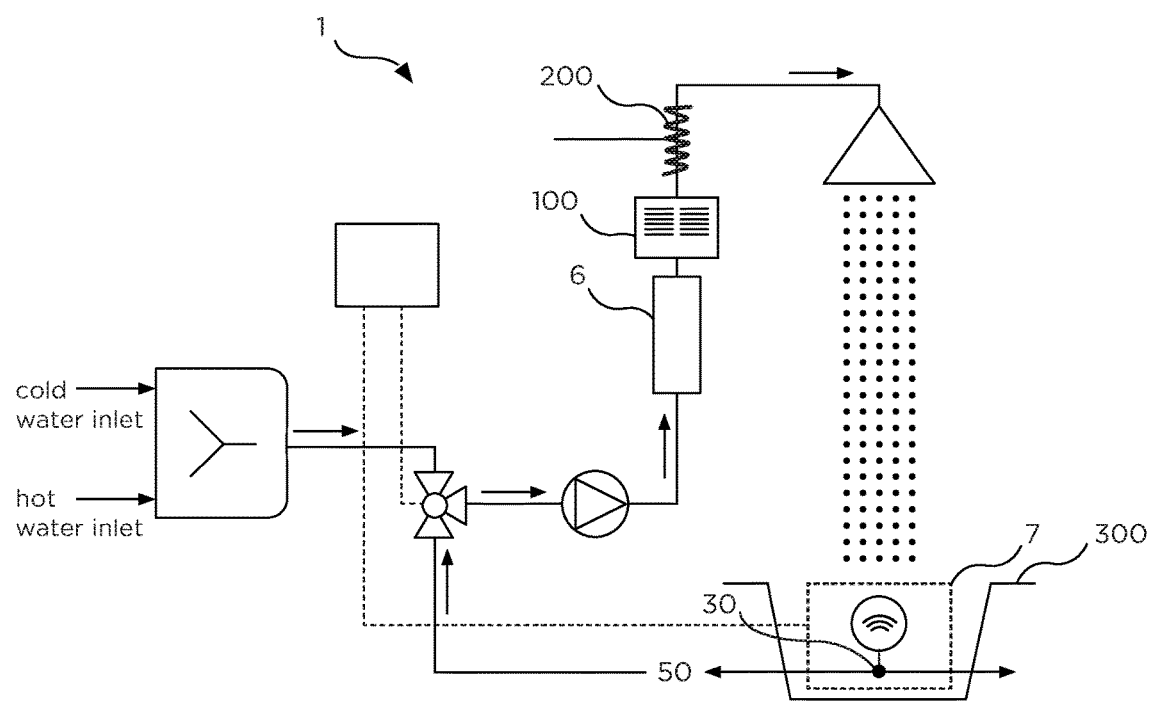
In FIG. 1 there is shown one specific embodiment of the present invention. The water recirculation system 1 according to the present invention is in this case in the form of a shower. The water recirculation system 1 comprises a water inlet, cold and warm side, which is led to a mixer. The clean water is flown into the water recirculation system via a valve and is then pumped through the water recirculation system 1 and out through the shower head. The water is treated in one water treating unit 6, which may be a UV unit or something else, possibly also combined with a filter, or in fact only comprise heating, and/or a UV/LED unit. The water recirculation system 1 comprises a first heating source 100 and a second heating source 200 so that the water may be heated up. In this case the first heating source 100 is a heater and the second heating source 200 should be seen as a heat exchange arrangement. Examples of similar set-ups is with a combined UV/heater unit to include both the water treating unit 6 and the first heating unit 100, and with an extra heat exchange arrangement as the second heating source 200, and which may be arranged to be in connection with the combined UV/heater unit (see FIG. 4 for one similar set-up).

Furthermore, in this case the water recirculation system 1 also comprises a point separation 30, which in this case is arranged in a drain 300. In this drain 300 there is provided a sensor unit 7 comprising at least one sensor which detects the water quality and sends a signal to a control unit (see connection as dotted lines), which makes a decision whether to separate off water, i.e. discard it because of low quality, or to send it in the flow path of recirculation 50 and by opening the valve then also enable to recirculate it in the entire flow path of recirculation 50 and reuse the water in the shower again. It should be noted that the sensor unit 7 may comprise several sensors, also in other parts of the system.

Figure 2:
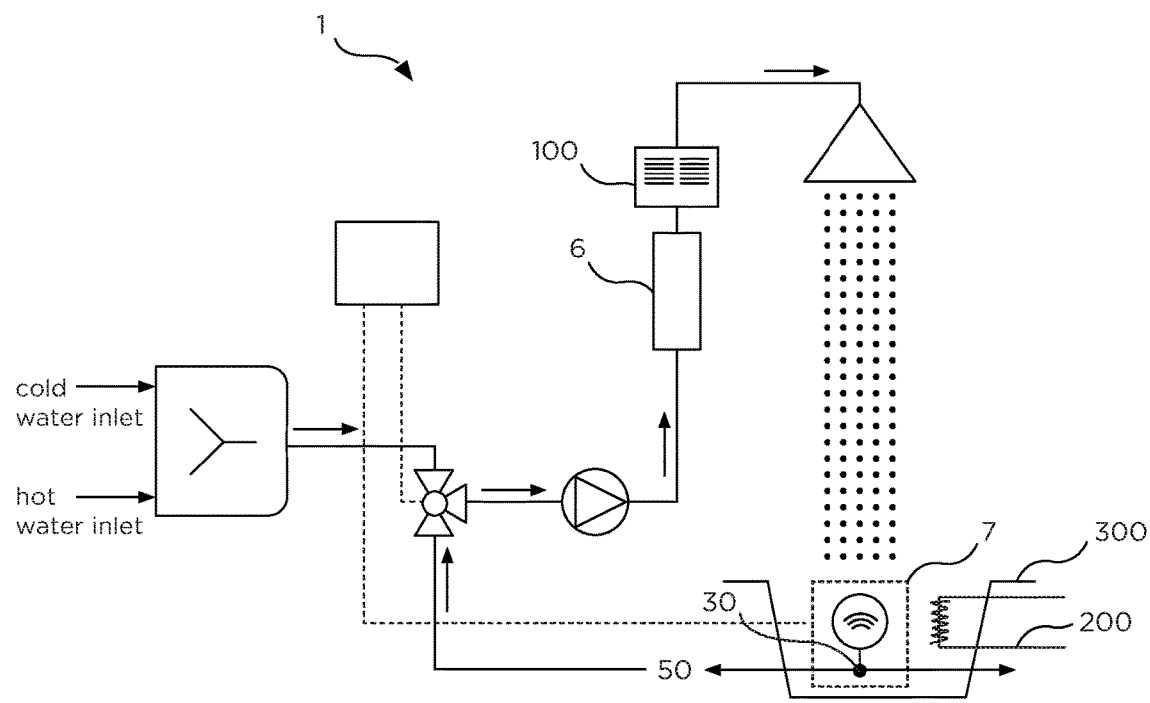

In FIG. 2 there is provided a similar embodiment as in FIG. 1, however in this case the second heating source 200 is arranged as a heat exchange arrangement in the drain 300.

Figure 3:
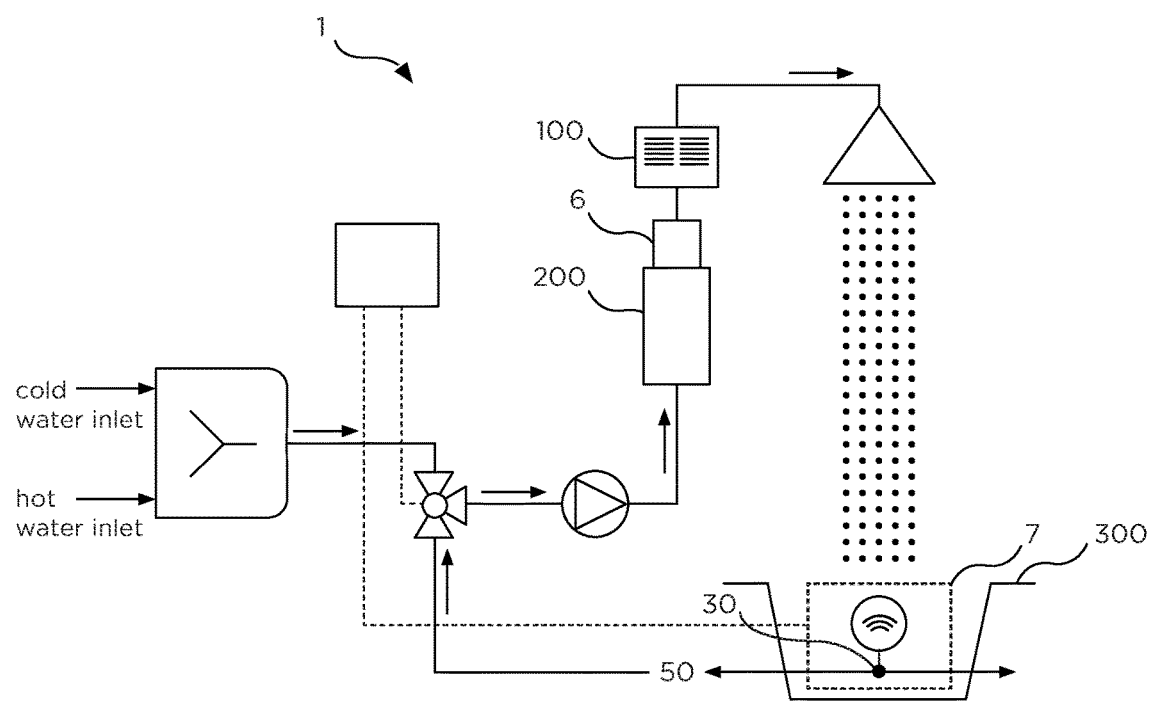

Moreover, in FIG. 3 there is provided yet another similar embodiment, however in this case the second heating source 200 is arranged as a jacket arrangement on the water treating unit 6. This may e.g. be a combined UV/heater arrangement.

Figure 4:
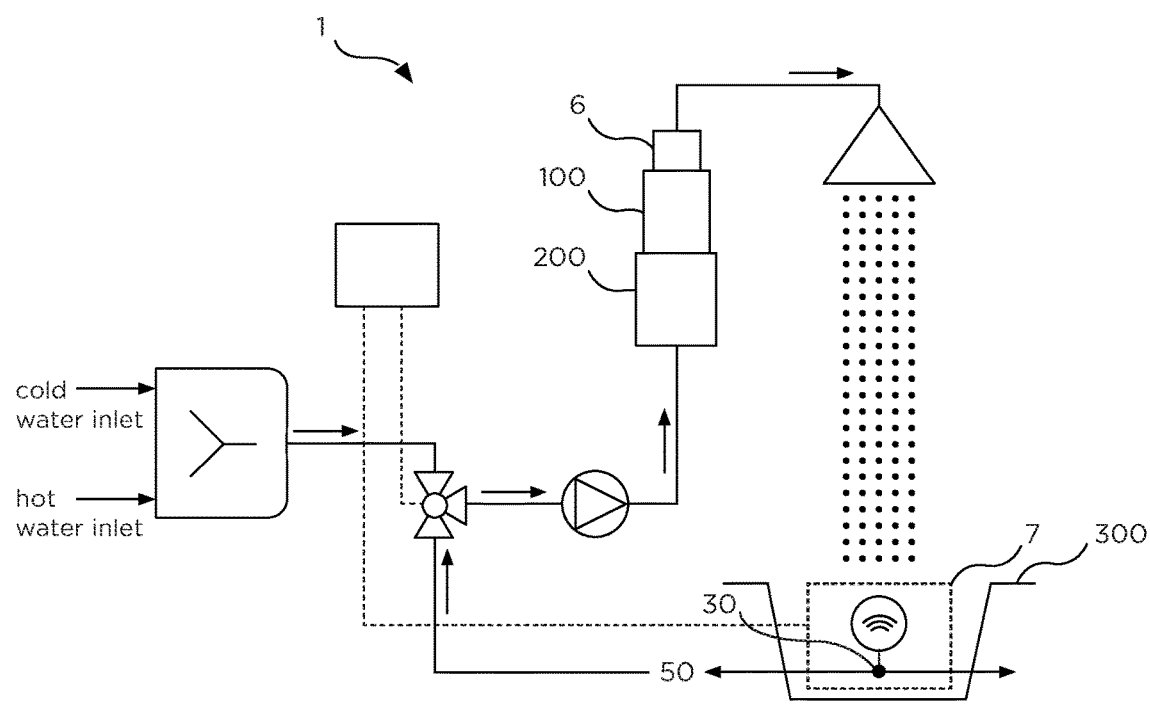

Furthermore, in FIG. 4 there is provided another similar arrangement, however in this case both the first heating source 100 and the second heating source 200 are arranged as separate jacket arrangements of the water treating unit 6. It should be noted that such a unit may be provided without any water treating unit 6, and in such a case the water treating unit 6 may be arranged at another position. In relation to this it should be noted that the present invention also embodies a water recirculation system 1 where the first heating source 100 and the second heating source 200 are positioned in one and the same unit, and where at least one of these is arranged as a heat exchange arrangement as a jacket of the unit.

Figure 5:
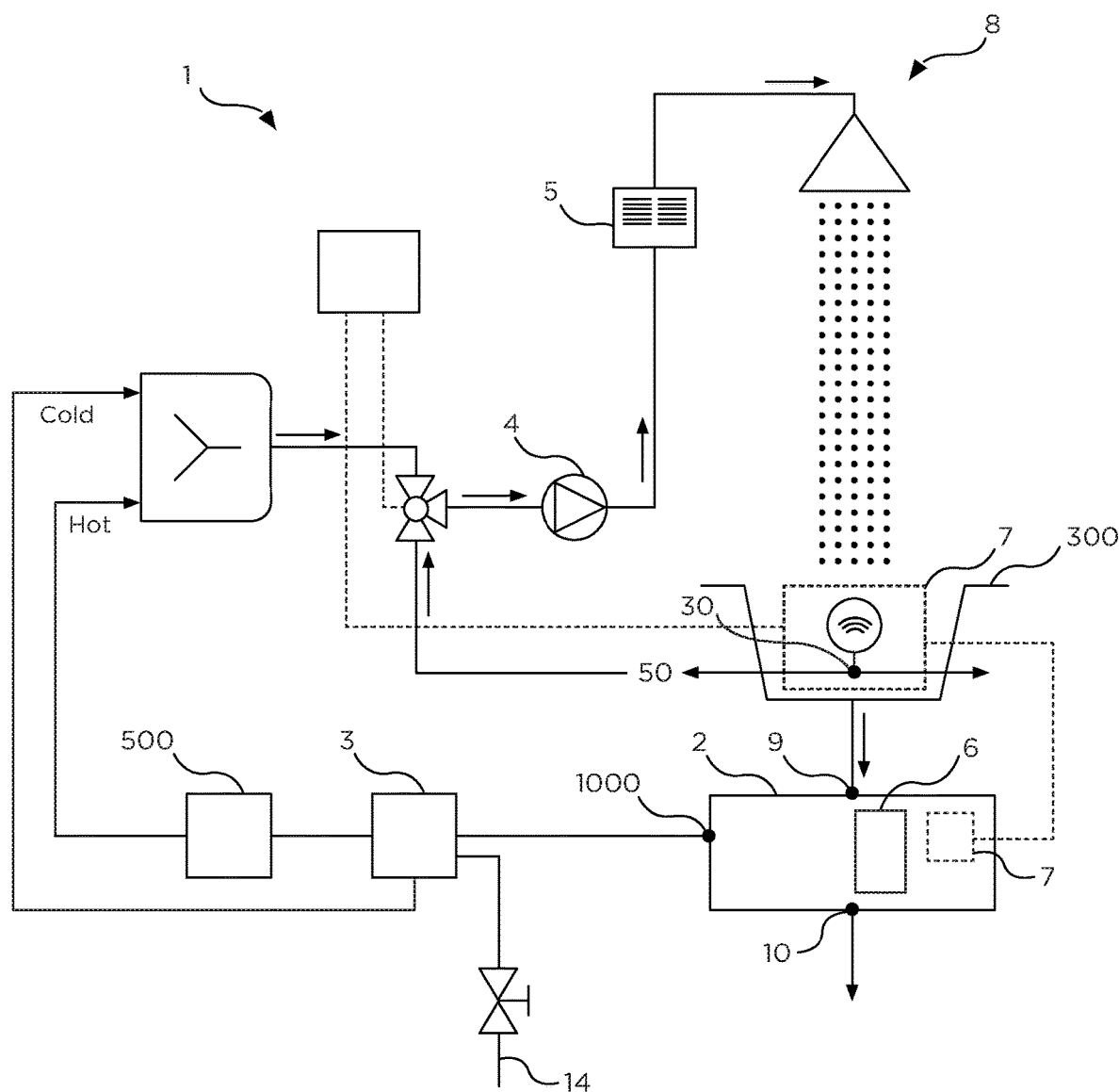

In FIG. 5 there is arranged another type of water recirculation system 1, e.g. in such a water distribution architecture in a recreation vehicle (RV). In this case the water recirculation system 1 comprises one or more user units 8, in this case only a shower, however e.g. also sinks could be totally possible. The water recirculation system 1 also comprises a water tank 3 and a heater 500. A fresh water inlet 14 provides water into the water tank 3.

This system 1 is provided to enable treatment and reuse of water in the water tank 3. Also in this case a pump 4 enables to pump water through the recirculation flow path 50 so that reuse is possible. The sensor unit 7 operates in a similar way as disclosed above, however in this case the water distribution unit 2 enables to treat water in the water tank 3 to maintain a high water quality so that water may be reused.

As notable, in this case the water distribution unit 2 comprises the water treating unit 6, e.g. in the form of a UV unit or the like.

It should be said that the drain 300 may be part of the water distribution unit 2. It may also be a first separate unit so that water can be recirculated directly in the flow path of recirculation 50. The sensor unit 7 may comprise one or several sensors, however at least one measures water quality.

Moreover, the water distribution system 1 comprises a heating source 5, being the first heating source 100 in this case. Furthermore, a connected water exchange arrangement may be arranged as the second heating source 200. In this case, however, the second heating source 200 is in the form of a heater 500 which enables heating of water recirculated from the water tank 3.

The water distribution unit 2 comprises one common user unit inlet 9 and one contaminated water outlet 10. If water is separated off it may for instance be sent to a grey water tank 11 (see FIG. 6). The at least one recirculation port 1000 is connected via piping to the water tank 3 to enable flowing water between the water distribution unit 2 and the water tank 3. In this case, the recirculation port 1000 enables flowing water both ways.

Figure 6:
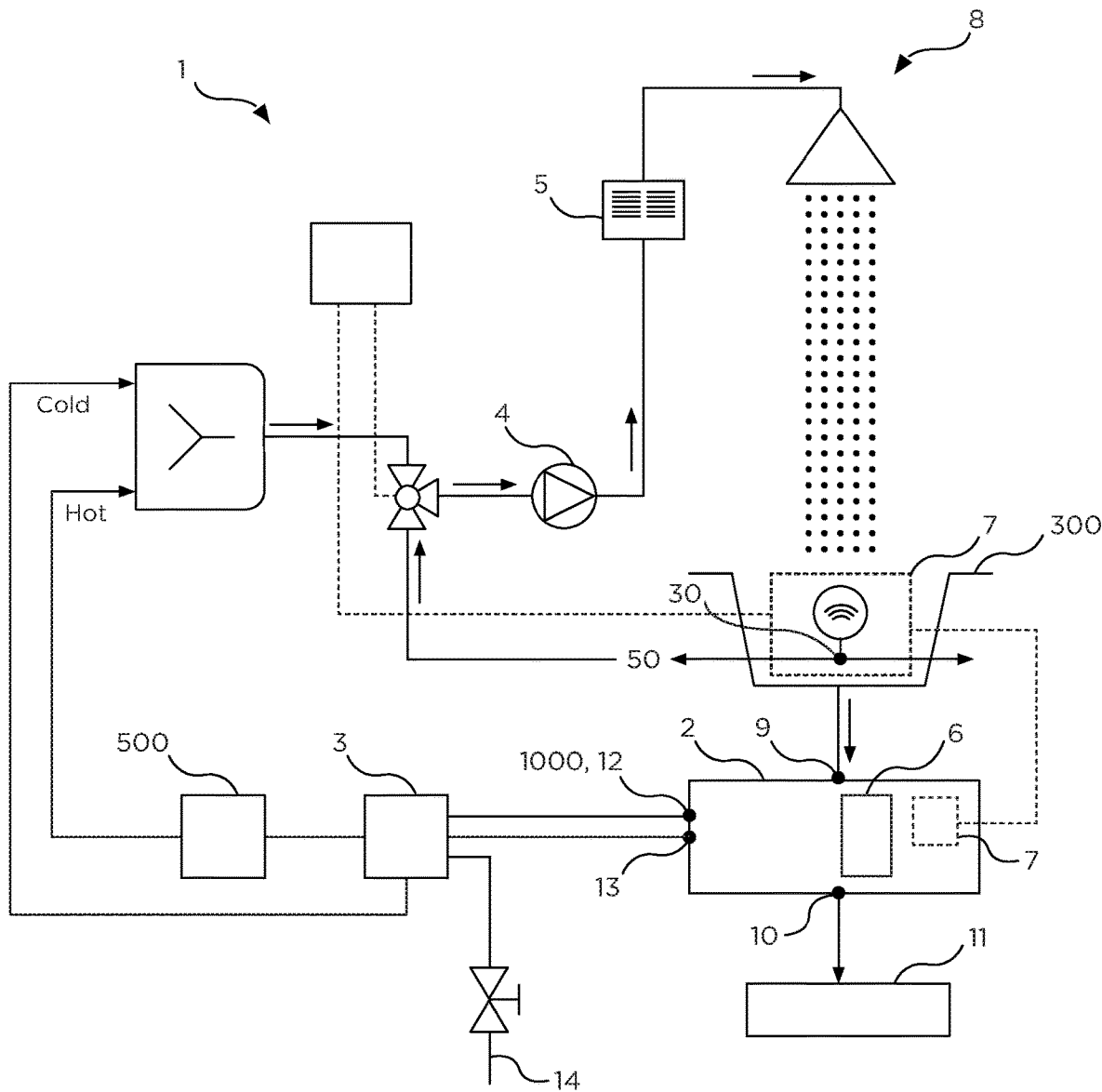

This is different when comparing with FIG. 6. In the case of the embodiment shown in FIG. 6 there are arranged a water recirculation outlet 12 connected to the water tank 3 so that water may be pumped from the water distribution unit 2 to the water tank 3, a water feed inlet 13 enabling to flow water from the water tank 3 to the water distribution unit 2. As mentioned, in this case water with low quality and not suitable to treat may be separated off to a grey water tank 11.

The invention claimed is:

1. A water recirculation system intended for recycling of water or discarding of water not suitable to recycle, said water recirculation system comprising:
   a flow path for recirculation;
   at least one water treating unit;
   a sensor unit arranged for measurement of at least water quality, wherein the sensor unit is connected to a control unit which decides if water should be recycled or discarded in a point of separation based on the measurement of the water quality;
   a first heating source; and
   a second heating source,
   wherein the first heating source and/or the second heating source is provided as a heat exchange arrangement,
   wherein said at least one water treating unit is a light unit provided inside of a vessel, and
   wherein the heat exchange arrangement is arranged as a jacket of the vessel.

2. The water recirculation system according to claim 1, wherein the first heating source and the second heating source are different types of heating sources.

3. The water recirculation system according to claim 1, wherein the first heating source or the second heating source is a heater tank containing a heating element.

4. The water recirculation system according to claim 1, wherein the first heating source or the second heating source is an external heating source.

5. The water recirculation system according to claim 1, wherein the point of separation is arranged in a drain and the heat exchange arrangement is provided in the drain so that water sent to waste is arranged to heat fresh cold water flown into the water recirculation system.

6. The water recirculation system according to claim 1, wherein the heat exchange arrangement is arranged in connection to said at least one water treating unit.

7. The water recirculation system according to claim 1, wherein the first heating source is also arranged in connection with said at least one water treating unit.

8. The water recirculation system according to claim 1, wherein the first heating source and the second heating source are positioned in the vessel.

9. A method for operating a water recirculation system according to claim 1, wherein the method comprises:
using the first heating source to provide heating for a base heating demand; and
using the second heating source to provide heating for peak heating demands as additional heating on top of the heating provided by the first heating source.

10. The method according to claim 9, wherein the second heating source is arranged to provide faster adjustability than the first heating source.

11. A method according to claim 9, wherein said method involves using the first heating source and the second heating source in different operation sequences.

12. The method according to claim 11, wherein the discarding water to waste includes heat exchanging the discarded water against fresh cold water flowing into the water recirculation system.

13. The water recirculation system according to claim 1, wherein the water recirculation system is a plug-in solution for a water distribution architecture comprising one or more user units, a water tank configured for water usage, a pump and a heating source, being the first heating source or the second heating source, wherein the water recirculation system comprises a water distribution unit
comprising:
one common user unit inlet connectable via piping to said one or more user units on their used water output side;
a contaminated water outlet; and
at least one water recirculation port connectable via piping to the water tank to enable flowing water between the water distribution unit and the water tank,
wherein said at least one water treating unit is configured to treat water to increase the water quality thereof and where the sensor unit is connected to a control unit, which, based on the measurement of the water quality, is arranged to decide if water should be recycled to the water tank from the water distribution unit or should be discarded via the contaminated water outlet from the water distribution unit.

14. The water recirculation system according to claim 1, wherein the water recirculation system is a plug-in solution for a water distribution architecture comprising one or more user units, a water tank configured for water usage, a pump and a heating source, being the first heating source or the second heating source, and a grey water tank, wherein the water recirculation system comprises a water distribution unit
comprising:
one common user unit inlet connectable via piping to said one or more user units on their used water output side;
a contaminated water outlet connectable via piping to the grey water tank;
a water recirculation outlet connectable via piping to the water tank;
and a water feed inlet connectable via piping to the water tank and/or to a fresh water inlet of the water distribution architecture,
wherein said at least one water treating unit is configured to treat water to increase the water quality thereof and wherein the sensor unit is connected to a control unit, which, based on the measurement of the water quality, decides if water may be recycled to the water tank from the water distribution unit or should be discarded and sent to the grey water tank from the water distribution unit.

15. A method comprising using a water recirculation system according to claim 14, for flowing water from a water tank of a water distribution architecture to the water distribution unit of the water recirculation system to enable water treatment to increase the water quality.

16. The method according to claim 15, wherein the method comprises:
using the first heating source to provide heating for a base heating demand; and
using the second heating source to provide heating for peak heating demands as additional heating on top of the heating provided by the first heating source.

17. The method according to claim 15, wherein the second heating source is arranged to provide faster adjustability than the first heating source.

18. The method according to claim 15, said method involving using the first heating source and the second heating source in different operation sequences.

* * * * *